United States Patent [19]
Mackinlay

[11] Patent Number: 6,088,032
[45] Date of Patent: Jul. 11, 2000

[54] COMPUTER CONTROLLED DISPLAY SYSTEM FOR DISPLAYING A THREE-DIMENSIONAL DOCUMENT WORKSPACE HAVING A MEANS FOR PREFETCHING LINKED DOCUMENTS

[75] Inventor: Jock D. Mackinlay, Palo Alto, Calif.

[73] Assignee: Xerox Corporation, Stamford, Conn.

[21] Appl. No.: 08/726,451

[22] Filed: Oct. 4, 1996

[51] Int. Cl.[7] .............................. G06F 3/00; G06F 17/30
[52] U.S. Cl. ........................................... 345/355; 707/501
[58] Field of Search .................................. 345/333, 334, 345/335, 355, 354, 339; 707/501

[56] References Cited

U.S. PATENT DOCUMENTS

| | | | |
|---|---|---|---|
| 5,060,135 | 10/1991 | Levine et al. | 364/200 |
| 5,140,677 | 8/1992 | Fleming et al. | 395/159 |
| 5,295,243 | 3/1994 | Robertson et al. | 395/160 |
| 5,295,261 | 3/1994 | Simonetti | 707/2 |
| 5,499,330 | 3/1996 | Lucas et al. | 395/145 |
| 5,515,488 | 5/1996 | Hoppe et al. | 345/440 |
| 5,546,529 | 8/1996 | Bowers et al. | 345/357 |
| 5,671,381 | 9/1997 | Strasnick et al. | 345/355 |
| 5,689,628 | 11/1997 | Robertson | 345/427 |
| 5,727,129 | 3/1998 | Barrett et al. | 395/200.47 |
| 5,768,578 | 6/1998 | Kirk et al. | 707/515 |
| 5,790,853 | 8/1998 | Nomura et al. | 395/674 |
| 5,801,702 | 9/1998 | Dolan et al. | 345/357 |
| 5,838,326 | 11/1998 | Card et al. | 345/355 |
| 5,855,020 | 12/1998 | Kirsch | 707/10 |
| 5,862,325 | 1/1999 | Reed et al. | 709/201 |
| 5,870,559 | 2/1999 | Leshem | 345/357 |
| 5,918,233 | 6/1999 | La Chance et al. | 707/104 |
| 6,006,227 | 12/1999 | Freeman et al. | 707/7 |

FOREIGN PATENT DOCUMENTS

| | | | |
|---|---|---|---|
| 9322738 | 11/1993 | WIPO | G06F 15/62 |

OTHER PUBLICATIONS

Foss, Carolyn L., "Tools for Reading and Browsing Hypertext", Information Processing and Management, v. 25, No. 4, pp. 407–418, Jan. 1989.

Yankelovich, Bernard et al., "Intermedia: The Concept and Construction of a Seemless Information Environment", Computer, vol. 21, No. 1, pp. 89–96, Jan. 1988.

Joachims, Thorsten et al., "Webwatcher: Machine Learning and Hypertext", Carneige Mellon University, pp. 1–5, May 1995.

Armstrong, Robert et al. "Webwatcher: a Learning Apprentice for the World Wide Web", Carnegie Mellon university, pp. 1–7, Feb. 1995.

Kaashoek, M. Frans et al., "Dynamic Documents: Mobile Wireless Access to the WWW", Proceedings of the Workshop on Mobile Computing Systems and Applications, pp. 179–184, Jan. 1995.

Jones, K. L., "Nif–T–Nav: a Hierarchial Navigator for WWW Pages", Computer Networks and ISDN Systems Conference, vol. 28, No. 7–11, pp. 14345–1453, May 1996.

(List continued on next page.)

*Primary Examiner*—Mark R. Powell
*Assistant Examiner*—Jeffrey Allen Rossi

[57] ABSTRACT

A means for prefetching linked document objects in a document workspace. A document object may be a document or a document collection. Such document objects have links to other document objects. The prefetching process of the present invention enables a user to obtain document objects linked to a document that they are interacting with before they are needed. Typically, such linked document objects are related so it is likely that they would be needed. The retrieved document objects are displayed so that their linking is indicated using a cone tree visualization. Various controls are provided which enable the user to stop and start the retrieval process, specify the scope and depth of retrieval, and to specify documents for which linked documents should not be retrieved. A history stack area is provided in the document workspace to place prior instances of cone tree visualizations of retrieved document objects.

21 Claims, 15 Drawing Sheets

OTHER PUBLICATIONS

Padmanabahn, V.N. et al., "Using Predictive Prefetching to Improve World Wide Web Latency", Computer Communiations Review, vol. 26, No. 3, pp. 23–36, Jul. 1996.

Horn, Robert E., "Mapping Hypertext: Analysis, Linkage, and Display of Knowledge of the Next Generation of On Line Text and Graphics". Lexington: the Lexington Institute, ISBN 90 060088, pp. 1–288, Jan. 1989.

Brown, Marc H. and Schillner, Robert C., "Deckscape, an Experimental Web Browser", Computer Networks and ISDN Systems, vol. 27, No. 6, pp. 1097–1104, Apr. 1995.

Brown, Marc H. and Schillner, Robert C., "New Paradigm for Browsing the Web", Proceedings of the Conference on Human Factors in Computing Systems, vol. 2, New York: Association of Computing Manufacturers, pp. 320–321, May 1995.

Douglis, Fred et al., "Webguide: Querying and Navigating Changes in Web Repositories", Computer Networks and ISDN Systems Conference, vol. 28, No. 7–11, pp. 1335–1344, May 1996.

Ballay, J. M., "Designing Workspace™: An Interdisciplinary Experience," *Human Factors in Computing Science,* CHI '94, Conference Proceedings, pp. 10–15.

Mander, R., Salomon, G., and Wong, Y.Y., "A 'Pile' Metaphor for Supporting Casual Organization of Information," *Human Factors in Computing Systems,* CHI '92 Conference Proceedings, May 3–7, 1992, pp. 627–634.

Staples, L., "Representation in Virtual Space: Visual Convention in the Graphic User Interface," *Human Factors in Computing Science,* INTERCHI '93 Conference Proceedings, Apr. 24–29, 1993, pp. 348–354.

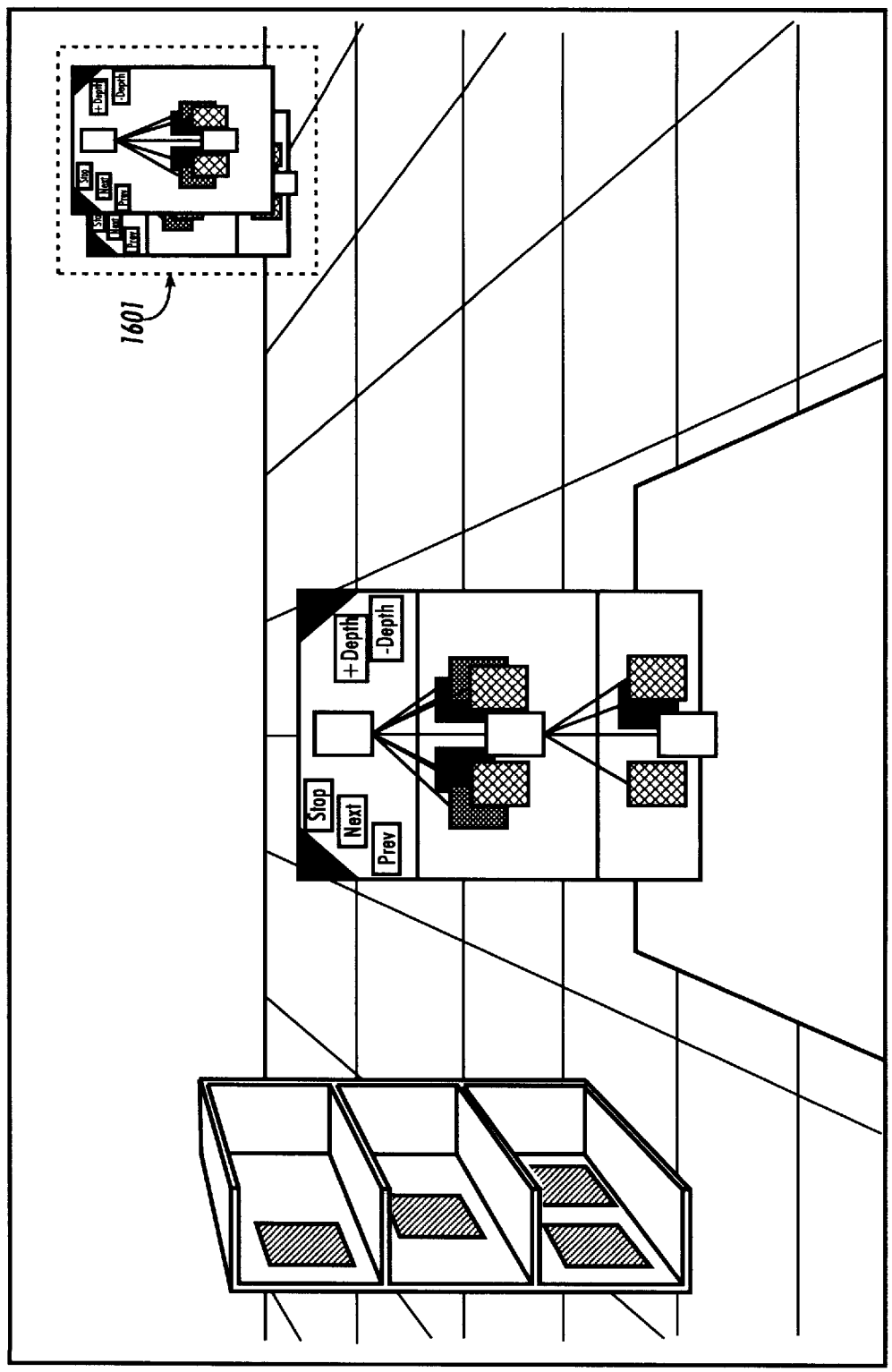

COMPUTER CONTROLLED DISPLAY SYSTEM FOR DISPLAYING A THREE-DIMENSIONAL DOCUMENT WORKSPACE HAVING A MEANS FOR PREFETCHING LINKED DOCUMENTS

CROSS REFERENCE TO RELATED APPLICATION

The present application is related to the following pending U.S. patents wherein the inventors in each have an obligation to assign ownership to the same assignee as the present application:

"System For Moving Document Objects In A 3-D Workspace", issued Nov. 17, 1998 as U.S. Pat. No. 5,838,326; and "3-D Document Workspace With Focus, Immediate And Tertiary Spaces", issued Dec. 8, 1998 as U.S. Pat. No. 5,847,709.

FIELD OF THE INVENTION

The present invention is related to the field of computer user interfaces, and in particular, a user interface for displaying and navigating through collections of related documents.

BACKGROUND

Access to and use of electronic documents is growing at a very explosive pace. To facilitate use of large collections of electronic documents, new techniques for querying and visualizing the content of such collections are being developed. For example, U.S. Pat. No. 5,546,529 describes a technique for viewing the results of a database search that has been mapped to a tree structure. The tree structure is visually mapped along a static reference surface having separate detail and context areas.

One source of the growth of access to electronic documents is the Internet, and in particular, the facet of the Internet known as the World-Wide-Web (referred to simply as the Web). The Web provides a means for making multimedia styled documents over the Internet. These documents are termed Web pages (hereinafter pages). Pages may refer to and provide access to other pages on the Web. Each page has associated with it an identifier termed a Uniform Resource Locator (URL). A page is accessed by specifying it's URL. The contents of a page is specified in a document formatting language known as the Hyper-Text Mark-Up Language (HTML). A reference to another page on the Web is termed a link. Links may be specified in either absolute or relative terms. A link specified in absolute terms refers to it's entire URL. A link specified in relative terms assumes a certain portion of the URL is the same as the existing page. The specification is thus relative to the URL of the page on which it is defined.

To access and view a document on the Web, a Web browser is needed. A Web browser provides search, traversal and viewing functions needed to access documents on the Web. Various Web browsers exist for the Web, e.g. NetScape available from NetScape, Inc. of Mountain View, California. Traversing through documents contained on the Web is similar to following a path through a network. Since each page may contain links to many other pages, traversing through the pages is a simple matter of following the links. Most Web browsers provide controls for going backwards and forwards in the list of links. They also maintain a history list of the links to enable jumping directly to a specific previously viewed page.

Most publicly available Web browsers operate on a computer controlled display system having a graphical user interface with multiple windows. Typically, such web browsers operate such that a window may display only one page at a time. Multiple pages are viewed by opening multiple windows. The user interface for Web Browsers typically correspond to the capabilities of the computer system on which it resides. A full featured Web browser may provide rendering means for viewing audio, video and graphical portions of documents as well as a graphical user interface for controlling access to documents. The graphical user interface is typically one which provides for vertical and horizontal scrolling via scroll bars and point and click manipulation of a cursor control device to invoke browser operations (e.g. to traverse links). Color, underlining or reverse video are techniques used to indicate the existence of a link on a page.

Related materials include:

*Deckscape: An Experimental Web Browser*, Marc H. Brown and Robert A. Shillner, DEC Systems Research Center Report 135a, Mar. 1, 1995. The DeckScape web browser utilizes the metaphor of a deck as a collection of Web pages. Only one Web page on a deck is visible at one time, although multiple decks may be visible. DeckScape is also multithreaded so that each deck may be "active", e.g. downloading pages, at the same time. A deck may be created based on a traversal through the Web or as the result of an operation such as "expand all the links on this page."

U.S. Pat. No. 5,499,330 entitled Document Display System For Organizing And Displaying Documents As Screen Objects Organized Along Strand Paths. As described in the Abstract, this references discloses a system for displaying documents in a computer controlled display device. "The system displays documents either in a completely free-form, a user controlled configuration or as strands, such that documents in a strand follow a strand path. The strand path is a two dimensional line through a three dimensional display space. The documents displayed on the strand are known as child documents, and each strand also has a parent document. Various constraints defining the strand are associated with the parent document, including a strand function defining the strand path, minimum and maximum separation constraints defining the distance between the child documents on the strand, and an origin constraint defining the positional relationship of the strand path to the screen object of the parent document."

A *'Pile' Metaphor for Supporting Casual Organization of Information*, Richard Mander, Gitta Saloman, Yin Yin Wong, Chi '92 Conference Proceedings, ACM Conference on Human Factors in Computing Systems, pgs 627–634, May 3–7, 1992. This article describes the design and development of a desktop interface element referred to as piles. Piles represent sets of related documents. These piles are analogous to stacks of paper often found in a persons office or workspace. Piles were observed to have the useful properties of being a less rigid categorization system and to be self-revealing and browsable. The described design includes direct manipulation techniques and support for browsing, automatic pile construction and reorganization.

*Representation in Virtual Space: Visual Convention in the Graphical User Interface,* Loretta Staples, Human Factors in Computing Systems INTERCHI'93 Conference Proceedings, pgs 348–354, Apr. 24–29 1993. This articles describes the use of three dimensional visual cues of perspective and lighting, in the context of flat or two-dimensional workspace. The use of transparency as a means of enhancing the workspace is also described. A desktop "landscape" is proposed that is divided by a horizon line denoting two separate areas: an active foreground space and a passive background space.

SUMMARY OF THE INVENTION

A three dimensional document workspace for interacting with large numbers of document objects is disclosed. The document object is a graphical representation of an individual document or a document collection. Typically, a document has links for retrieving other documents. The document workspace has been implemented for use to display and interact with documents, typically web pages, that have been downloaded from the World Wide Web. However, the document workspace is also suitable for use to display documents or document collections obtained from other sources (e.g. from a CD-ROM). Document collections are typically in the form of WebBooks or piles. WebBooks are document collections that are represented to a user using a book metaphor. A pile is a representation of a document collection that resembles a pile of paper contained in a paper tray.

The document workspace is divided hierarchically in terms of interaction rates. A focus space is where direct interaction with a document object occurs. The interactions occurs in a manner suitable for the document object in the focus space. The focus space is generally the center of the display area. An immediate memory space is for placing document objects that are in use, but not currently being interacted with. Visually in the document workspace the immediate memory space is divided into an "air" space and a "desk". The desk is a familiar metaphor for placing documents on that are not currently being viewed, but are in use. The "air" is located "behind" the focus space. The "air" is further divided into subareas. Each of the subareas corresponds to a distance back (i.e. in the z-direction) in which the document object is positioned. The further back, the smaller the size of the representation of the document object. A tertiary space is where many document objects, e.g. WebBooks and frequently referenced documents that are not currently in use may be positioned. The tertiary space is visually represented as a bookshelf.

Often when document objects are viewed, prefetching of documents linked to a document in the focus area is desirable. This prefetching is a result of the reasonable anticipation that the user will want to view the linked documents. The present invention provides a cone walker process which enables a user to control prefetching of linked documents. Fetched documents are displayed hierarchically in a cone tree visualization. User controls enable a user to stop and start the retrieval process, scope of retrieval (e.g. only documents on the same server) specify the depth of retrieval (i.e. the number of link levels to retrieve), and to specify documents for which linked documents should not be retrieved. A history stack area is provided in the document workspace to place instances of cone tree visualizations of retrieved document objects.

Moving document objects in the document workspace is facilitated by a touch and drop gesture. When a document object is touched, and a button on the associated cursor control device remains depressed, a line is drawn to indicate where the object is to be dropped. This helps facilitate a determination of where the document object is to be placed. Document objects may also be flicked to the immediate and tertiary areas so as to permit rapid movement of the document objects.

BRIEF DESCRIPTION OF THE DRAWINGS

FIG. 16 is an illustration of a ConeWalker history stack positioned in the document workspace of the currently preferred embodiment of the present invention.

DETAILED DESCRIPTION OF THE INVENTION

A computer controlled display system for displaying a three-dimensional document workspace is disclosed. One or more documents objects are present in the document workspace. The present invention provides for interaction with the collections, e.g. viewing, moving and storing, while balancing the necessary tradeoffs of rapid access, number of collections and associated documents, and available screen space.

The currently preferred embodiment of the present invention is implemented for use with collections of pages (i.e. documents) obtained from the portion of the Internet known as the World Wide Web (hereinafter the Web). However, it should be noted that the present invention is not limited to use on the Web and may be utilized in any system which provides access to collections of documents. For example, the present invention may be used in a system wherein documents are stored on and obtained through a CD-ROM media.

The following terms defined herein are familiar to users of the Web and take on these familiar meanings:

World-Wide Web or Web: The portion of the Internet that is used to store and access linked multi-media documents.

Page: A document accessible on the Web. A Page may have multi-media content as well as relative and absolute links to other pages.

Link: An indicator on a Web page which refers to another Web page and which can typically be retrieved in a point and click fashion. The Link will specify the Uniform Resource Locator (URL) of the other Web page.

Web Browser or Browser: A tool which enables a user to traverse through and view documents residing on the Web. Other rendering means associated with the Browser will permit listening to audio portions of a document or viewing video or image portions of a document.

WebBook: A representation of an aggregation of Web pages which provides rapid local interaction. WebBooks are described in further in copending application Ser. No. 08/525,936 entitled "Display System For Displaying Lists Of Linked Documents" filed Sep. 8, 1995, which is assigned to the same assignee of the present application and which is hereby incorporated by reference.

ConeWalker: A cone tree representation of a Web page and its "linked" pages. The ConeWalker presents a visual history of the linked Web pages retrieved.

Document Object or Object: Any graphical representation of an entity, e.g. a page, WebBook or ConeWalker, in the document workspace.

Figure 1:
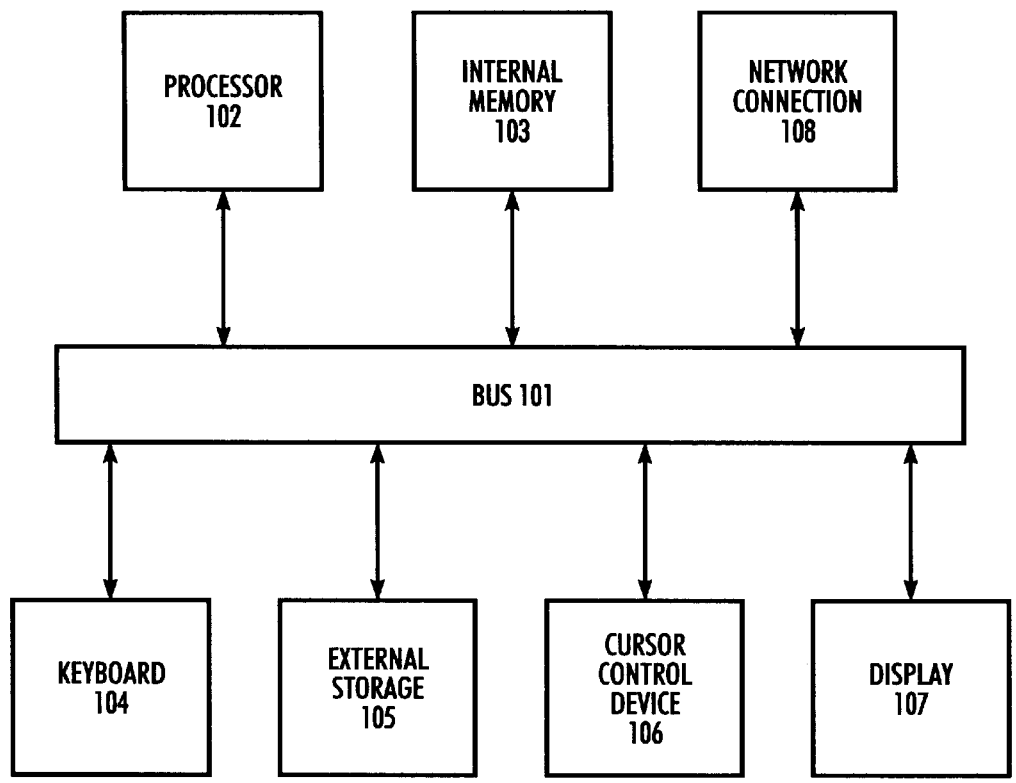
FIG. 1 is a block diagram of a computer controlled display system as may be utilized in the currently preferred embodiment of the present invention.

The computer based system on which the currently preferred embodiment of the present invention may be implemented is described with reference to FIG. 1. The computer based system and associated operating instructions (e.g. software) embody circuitry used to implement the present invention. It should be noted that the computer based system will preferably have multi-tasking capabilities wherein multiple processing operations can be carried out concurrently. As will be described below, this will enable such capabilities as prefetching of documents. Referring to FIG. 1, the computer based system is comprised of a plurality of components coupled via a bus 101. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access and Read Only Memories). The processor 102 will be used to perform various operations in support of obtaining Web pages, converting Web pages into a suitable format for display in the document workspace and interpreting and carrying out movement gestures. Instructions for performing such operations are retrieved from Internal memory 103. The processor 102 and Internal memory 103 may be discrete components or a single integrated device such as an Application Specification Integrated Circuit (ASIC) chip.

Also coupled to the bus 101 are a keyboard 104 for entering alphanumeric input, external storage 105 for storing data, a cursor control device 106 for manipulating a cursor, a display 107 for displaying visual output (e.g. the document workspace) and a network connection 108. The keyboard 104 would typically be a standard QWERTY keyboard but may also be a telephone like keypad. The external storage 105 may be fixed or removable magnetic or optical disk drive (e.g. a CD-ROM). The external storage 105 may itself store document objects. The cursor control device 106, e.g. a mouse or trackball, will typically have a button or switch associated with it to which the performance of certain functions can be programmed. In the currently preferred embodiment such a switch will have a first up position and a second down position which are used to select and move document objects within the document workspace. The network connection 108 provides means for attaching to a network, e.g. a Local Area Network (LAN) card or modem card with appropriate software. The network ultimately attached to is the Internet, but it may be through intermediary networks or On-Line services such as America On-Line, Prodigy™ or CompuServ™. Moreover, the network connection provides for attaching to one or more servers having document objects.

The currently preferred embodiment of the present invention has been implemented on a Silicon Graphics workstation with graphics facilities as described in SGI Graphics Library Programming Guide, Silicon Graphics, Inc. of Mountain View, Calif. The Silicon Graphics workstation provides for generating software programs which manipulate graphical objects in a three dimensional space, so description of programming techniques for rendering graphical objects in a three dimensional space is not deemed necessary.

It should be noted that it would have been apparent to one of skill in the art to implement the present invention on other suitable computer systems providing functionality for manipulating graphical objects in a three dimensional space. Such implementations would not depart from the spirit and scope of the present invention.

Finally, the present invention is implemented on a computer controlled display system having a Graphical User Interface (GUI). Operations for moving pages or page collections in the GUI have been created that support use in the Document Workspace. Such operations are described in greater detail below. Other operations are invoked in a similar fashion and perform a similar function as in known GUIs. For example, the act of "touching" a document or document collection is analogous to "selection" by a point and click operation of a cursor control device.

The Document Workspace

The purpose of the document workspace is to allow a large number of document objects to be displayed together (mitigating the limitations of the small screen space) in order to support information intensive activities. Interaction with pages is similar to the functionality of a Web browser. The workspace sets up explicitly the capacity for speed/access-time tradeoff to allow tuning for such activities. The design aims to provide very rapid access to a small number of pages, smoothly integrated with slower access to a large number. Pages for ongoing activities migrate into the rapid access and manipulation region (i.e. the focus region described below). In this way, repeated reference due to locality of reference statistics can result in faster interaction.

It is also very useful that the document workspace is three dimensional. The visual cues in a three dimensional workspace enable the placement of a greater number of documents in positions and orientations which are readily acceptable to the user. Further, the three-dimensional nature of the workspace provide for a much larger workspace since it permits placement of workspace objects "behind" or the "the side" of the user. Thus, by simply "turning a viewpoint" different portions of the workspace are brought into view.

Figure 2A:
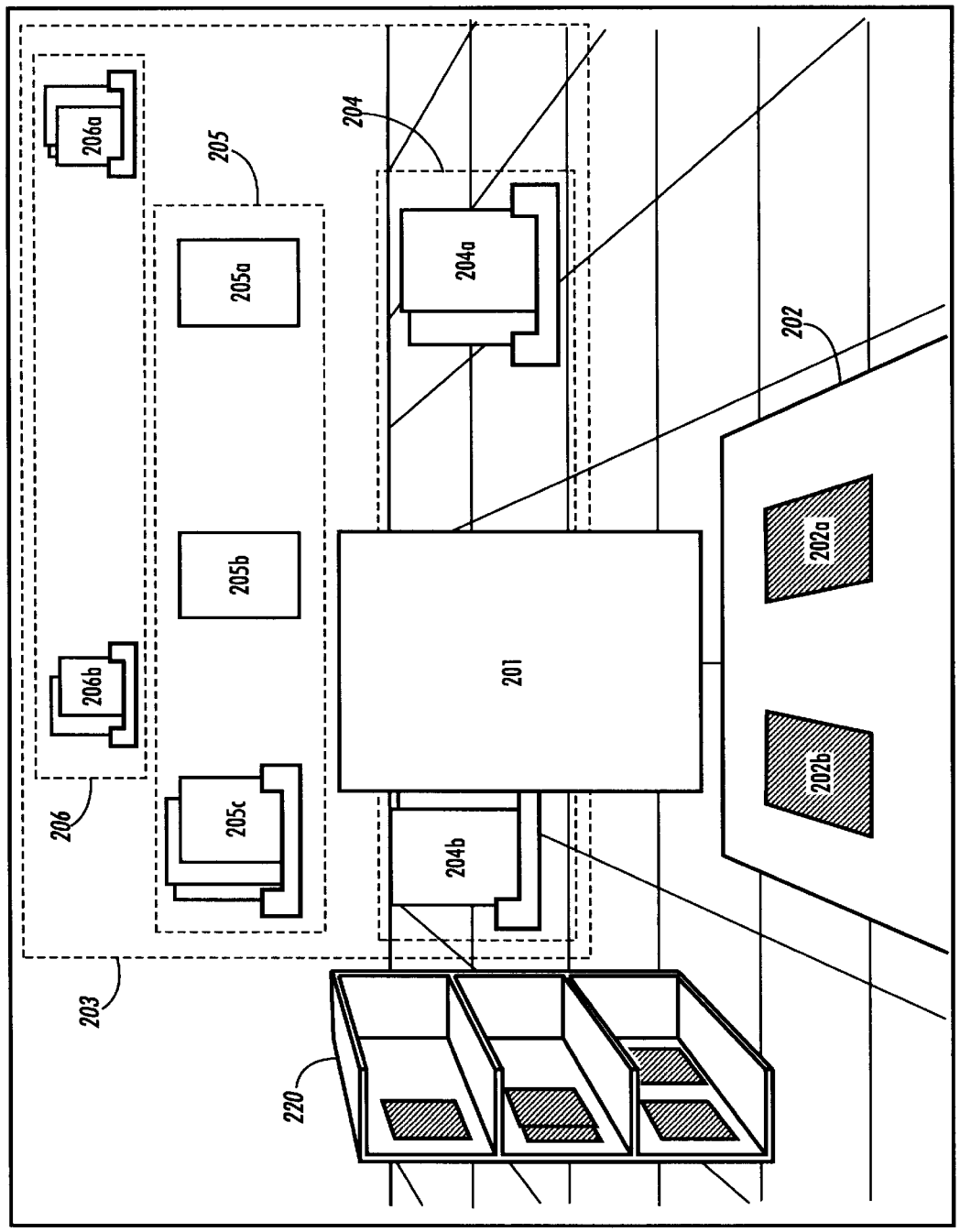
FIG. 2a illustrates the default view of the document workspace of the currently preferred embodiment of the present invention.

The document workspace of the currently preferred embodiment is illustrated with reference to FIG. 2a. It should be noted that the "user view" of the workspace is the primary or default view. As the document workspace is three-dimensional, traversal through the workspace is permitted to achieve different views of the workspace. The document workspace is arranged hierarchically, based on interaction rates, into three main levels: a Focus Space (for the document objects in active use), Immediate Memory Space (for document objects in use) and Tertiary Space (for document objects not in use). It should be noted that at each of the different levels, the amount of display space per document object roughly corresponds to the interaction rate with the document object. This will become apparent in the description below.

The Focus Space is where a document object that a user is directly interacting with is shown. In other words, the document object is in active use. In the currently preferred embodiment, the focus space may contain a page, pile, WebBook or even a representation of the Tertiary Space. Referring to FIG. 2a, a document object 201 is in the Focus Space. In the currently preferred embodiment document objects are viewed and interacted with in a manner associated with the particular object. So for pages downloaded from the world-wide web in an HTML format, the pages are interacted with using a browser capable of viewing HTML formatted documents. With respect to document collections, a document collection may be viewed as a pile of individual web pages or as a WebBook or viewed in a linear organization using a Document Lens Visualization. The Document Workspace provide a means for selecting the manner in which a page collection is viewed, e.g. using a pull-down menu.

When viewed as a WebBook, the pages are organized in a book metaphor. User interface controls are provided which enable a user to traverse a page, scale pages, turn pages, place bookmarks and to automatically scan the WebBook. The user interface for viewing the pages in the WebBook is described in greater detail in co-pending and commonly assigned U.S. patent application Ser. No. 08/525,936 entitled "Display System For Displaying Lists Of Linked Documents" filed Sep. 8, 1995.

The Document Lens is an information visualization technique which shows a thumbnail representation of each page of a document as if they were laid out in sequential order on a plane. A tool, i.e. the lens, is moved over the document pages to bring the desired portions into focus. Further detail with respect to the viewing of multi-page documents using a Document Lens is described in the article by Robertson and Mackinlay entitled "The Document Lens" UST '93, ACM Conference on User Interface Software and Technology, pgs. 101–108, 1993.

The Immediate Memory Space is where document objects are positioned when they are in use, but not currently interacted with. In FIG. 2a, a "desk" 202 and the "air" 203 behind the focus space comprise the Immediate Memory Space. The "air" 203 component of the Immediate Memory Space has several tiers. Document objects are arranged at several predetermined z-distances in the 3D space. Three (3) such tiers are illustrated in FIG. 2a, tiers 204–206. The user can move document objects back in space (the farther back, the smaller they become and the more document objects that fit). This is illustrated by noting the size differences in the visual representations of document collections 204a–b and document collections 206a–206b. To help with occlusion problems, a camera (or viewing) position is chosen so that at least one row of documents will fit in a farther-back tier without being occluded by nearer objects. Document objects in the Immediate Memory Space can be moved around in X and Y (i.e. left/right or up/down) or forward and backward (that is in Z) using a simple gesture language described below. The desk 202 may also contain document objects, e.g. document objects 202a and 202b. When the user moves around in the Document Workspace, the desk 202, and hence objects on the desk may move. Generally, the most recently used document objects are placed on the desk 202. In the currently preferred embodiment, the Immediate Memory Space can hold about 30 document objects without occlusion, and over a hundred if occlusions are allowed. Each of the document objects in the Immediate Memory Space is presented "face-up".

The Tertiary Space is where document objects such as pages and WebBooks may be positioned when they are not in use. For example, document objects that are used for reference purposes are placed in the tertiary space. Referring to FIG. 2a, in the currently preferred embodiment the tertiary space is represented as a bookcase 220. In normal view, the bookcase is seen at an angle to minimize the amount of screen space that is consumed, while at the same time displaying enough information that recently-used Web-Books or pages can be recognized. If the user "touches" one of the WebBooks or pages in the bookcases, it will automatically "fly" to the focus space 201. Simultaneously, any WebBook or page then in the focus space 202 will fly to a position in the Immediate space 203. The "flying" of objects is an animation which 'shows the movement of objects from one space to another.

Figure 2B:
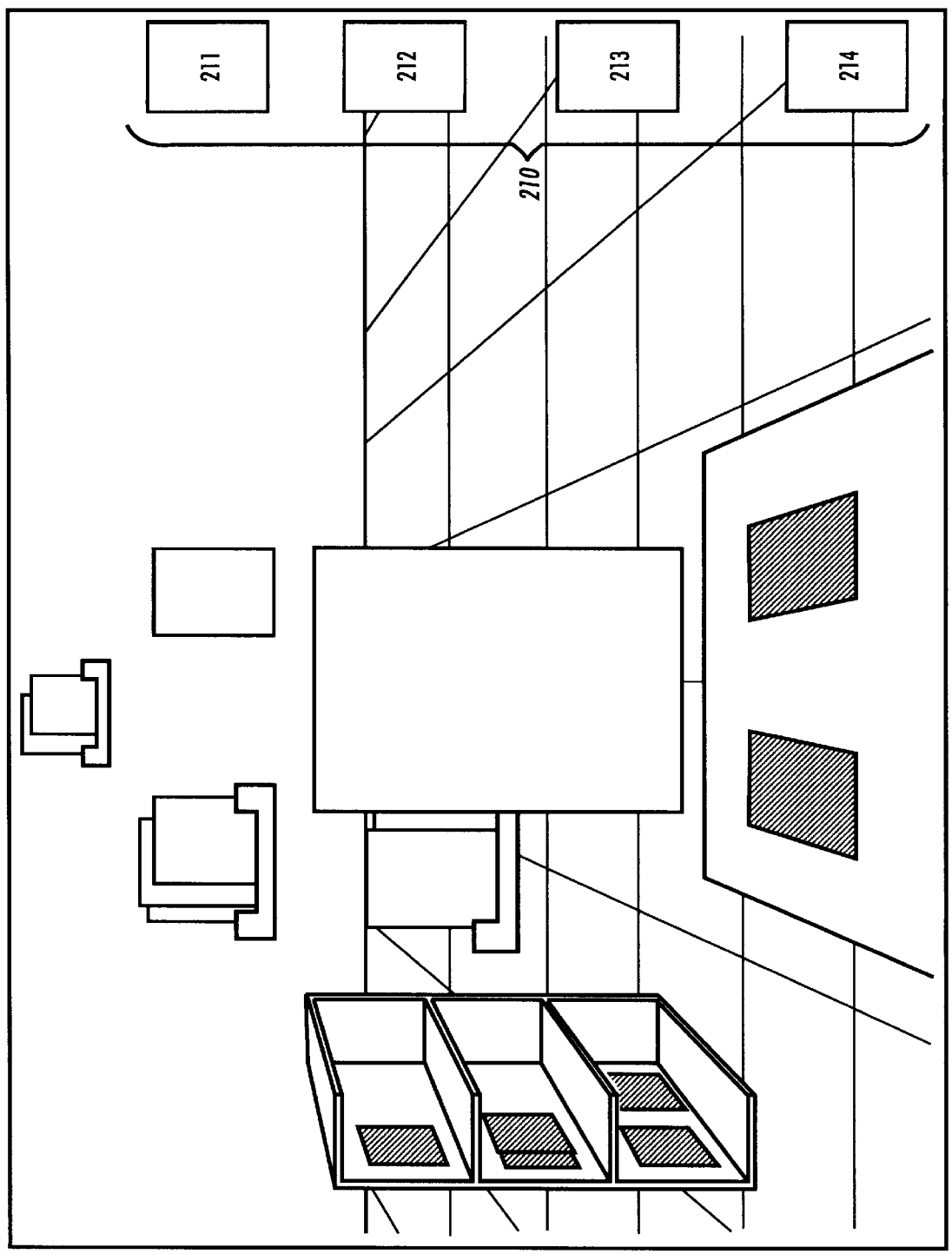
FIG. 2b illustrates the default view of the document workspace with a received page area.

The document workspace of the currently preferred embodiment is designed to perform multiple tasks concurrently. So for example, one document object may be interacted with by the user and concurrently, a Web access request may be performed with retrieved web pages being brought into the document workspace for subsequent interaction. FIG. 2b illustrates the document workspace of FIG. 2a with a received page space 210. The received page space is an area in the document workspace wherein newly retrieved pages are displayed. In FIG. 2b, new pages 211–214 have been received. The newly received pages may be the result of accessing a linked page on a page being interacted with or the result of a Web search request.

Figure 3:
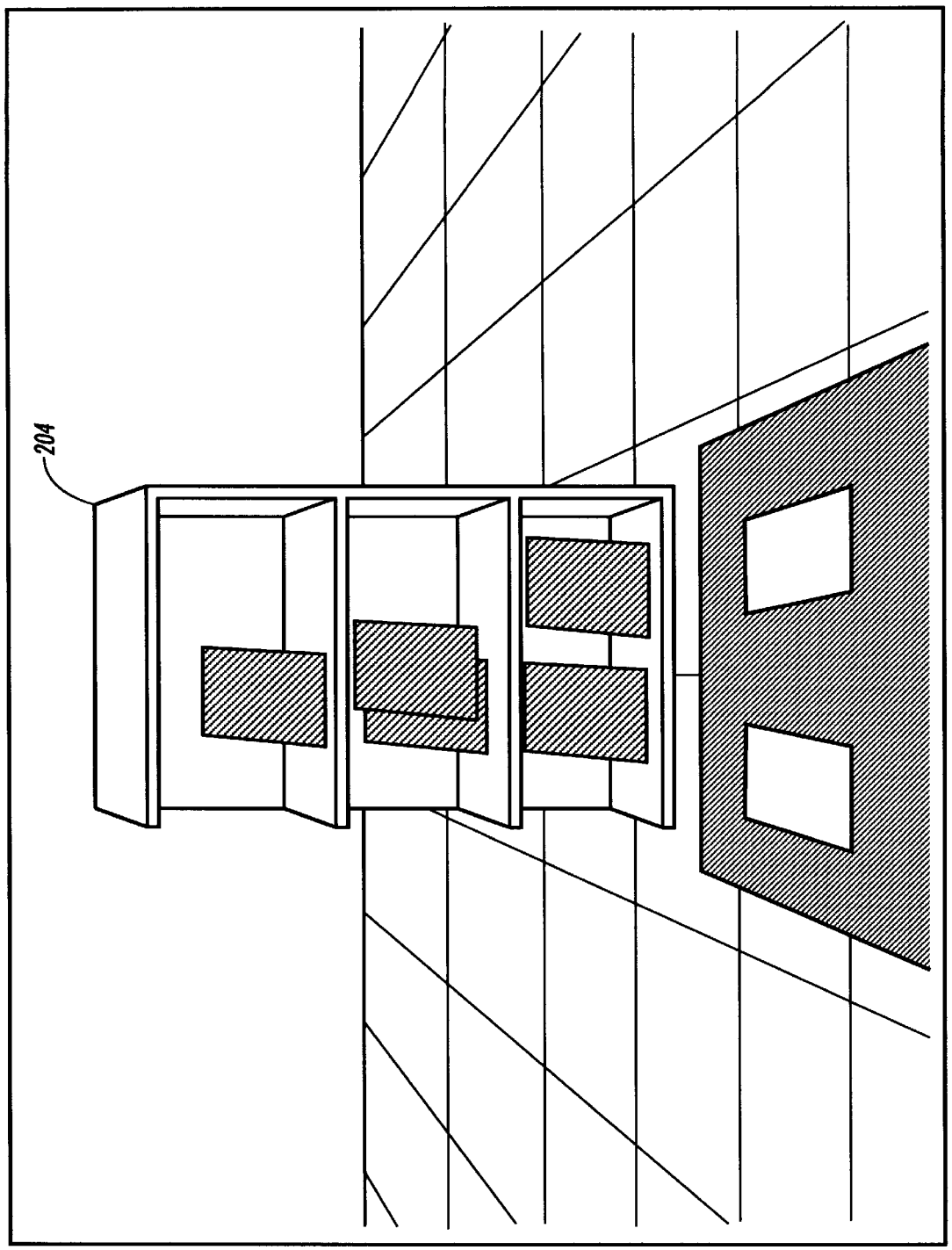
FIG. 3 is an illustration of a view showing the tertiary space (i.e. the bookcase) in the focus space of the document workspace.

In order to view the contents of the tertiary space, i.e. the bookcase, it should be positioned in the focus space. The bookcase may be either private or public. A private bookcase is one where the contents are created and "owned" by the "owner" of the workspace. A public bookcase is one that has content that is centrally updated and maintained. For example, a phone directory may be centrally maintained and subsequently distributed to public bookcases (or shelves) in user workspaces. There may even be separate private and public "shelves" on the bookcase (or even separate private and public bookcases). Touching the bookcase 220 causes the bookcase to fly to the focus space. This is illustrated in FIG. 3. Referring to FIG. 3, the bookcase 220 now occupies the focus space so that the contents of the bookcase can be viewed in closer detail. It should also be noted that despite the movement, the desk remains in the same position with respect to the focus space (i.e. directly underneath it). Also, the desk and any pages on the desk have been resized in order to maintain a visually acceptable size perspective with respect to the new view. What conceptually has occurred is the that user view has been changed to move in front of the bookcase, rather than the bookcase moving (this is substantiated by the fact that the component of the immediate space 203 termed "air" having the floating documents is no longer visible). Subsequently touching a WebBook or page on the bookcase will cause the user view to fly back to the default viewing position and the "touched" WebBook or page to fly to the focus space.

Document Objects

A document object is any entity that can be manipulated in the document workspace. A document object contains two basic types of information; content information and display/manipulation information. The content information refers to the text and image data for the underlying document. The display/manipulation information refers to data defining how the text and image data is to be presented to the user. Some examples:

for a web page the display/manipulation information would be a web browser;

for a document collection the display/manipulation information may be a WebBook browser;

for a web page, and subsequently a document collection, the display/manipulation may be the ConeWalker representation described below.

How a document object is visually represented depends on what it represents. An individual document or web page will be represented initially by the first page or by the top part of the web page. While still in use, subsequent representations will simply be where the document was when last viewed. For document collections represented as WebBooks, the representation will be the "cover" of the book. When not in active use, the WebBook will close, but be bookmarked so that when re-opened it will automatically open to the last page viewed.

The internal representation of a document object is as a data structure having content data representing the information, i.e. text or image, that the document object represents and information for indicating how the content data will be processed for rendering and display. The later data may be a program name to be linked to or actual program code. Data structures for handling such information are well known in the art.

Moving Document Objects In The Document Workspace

The simplest way of moving a document object in the document workspace is to position the cursor on the desired document object and clicking the associated switch on the cursor control device. This causes the document object to move to the focus space, and to move the document object previously occupying the focus space to move to the immediate space (the desktop). However, it is often desirable to move document objects to locations other than the focus space.

Known techniques for operating in a 2-D workspace, e.g. a drag and drop operation to move an object, do not work well in a 3-D workspace. One reason is that objects may be separated by large Z values and would require painstaking movement to adjust Z values within a "drop zone". A second reason is that foreground (hence large) objects obscure many background (hence small) objects so they are not visible. Simply picking up and moving around a foreground object would tend to obscure background objects.

To address these problems, a touch drop gesture is provided. Basically, a touch drop gesture is one where an object is "touched", e.g. by positioning a cursor over it and depressing a cursor control button, tracing the cursor movement with a line, and then dropping the object by releasing the cursor control button at the end point of the line. A constraint of the touch-drop gesture is that the end point of the line must be on some other document object (or another visible object in the workspace like the bookcase of the desk). Otherwise, no movement or other action is taken (i.e. a null operation). The final operation of the touch drop gesture is context sensitive. So if the touched object is a WebBook and the drop object is the bookcase, the WebBook is stored on the bookcase.

Figure 4:
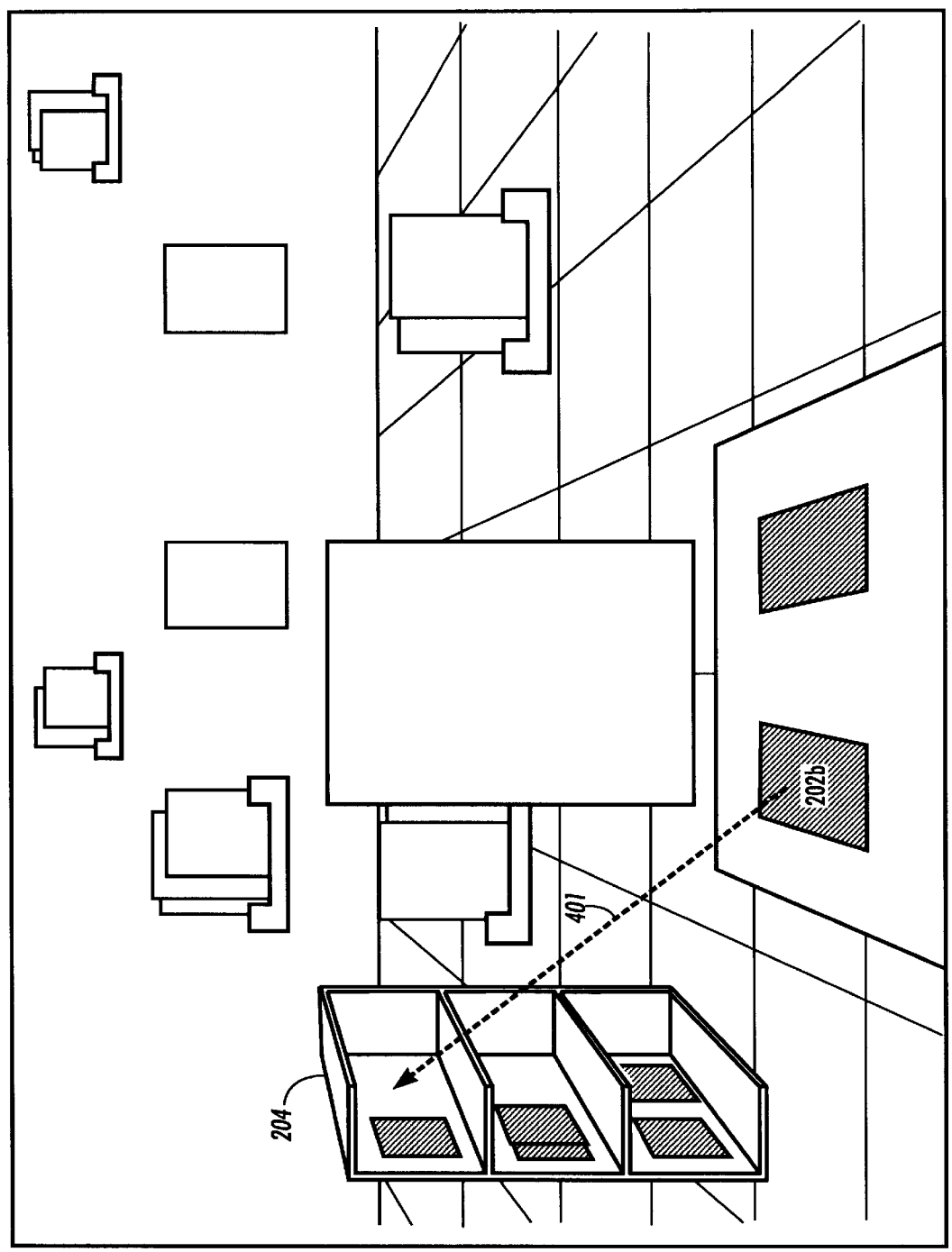
FIGS. 4–5 illustrate a touch drop gesture as may be performed in the document workspace of the currently preferred embodiment of the present invention.
Figure 5:
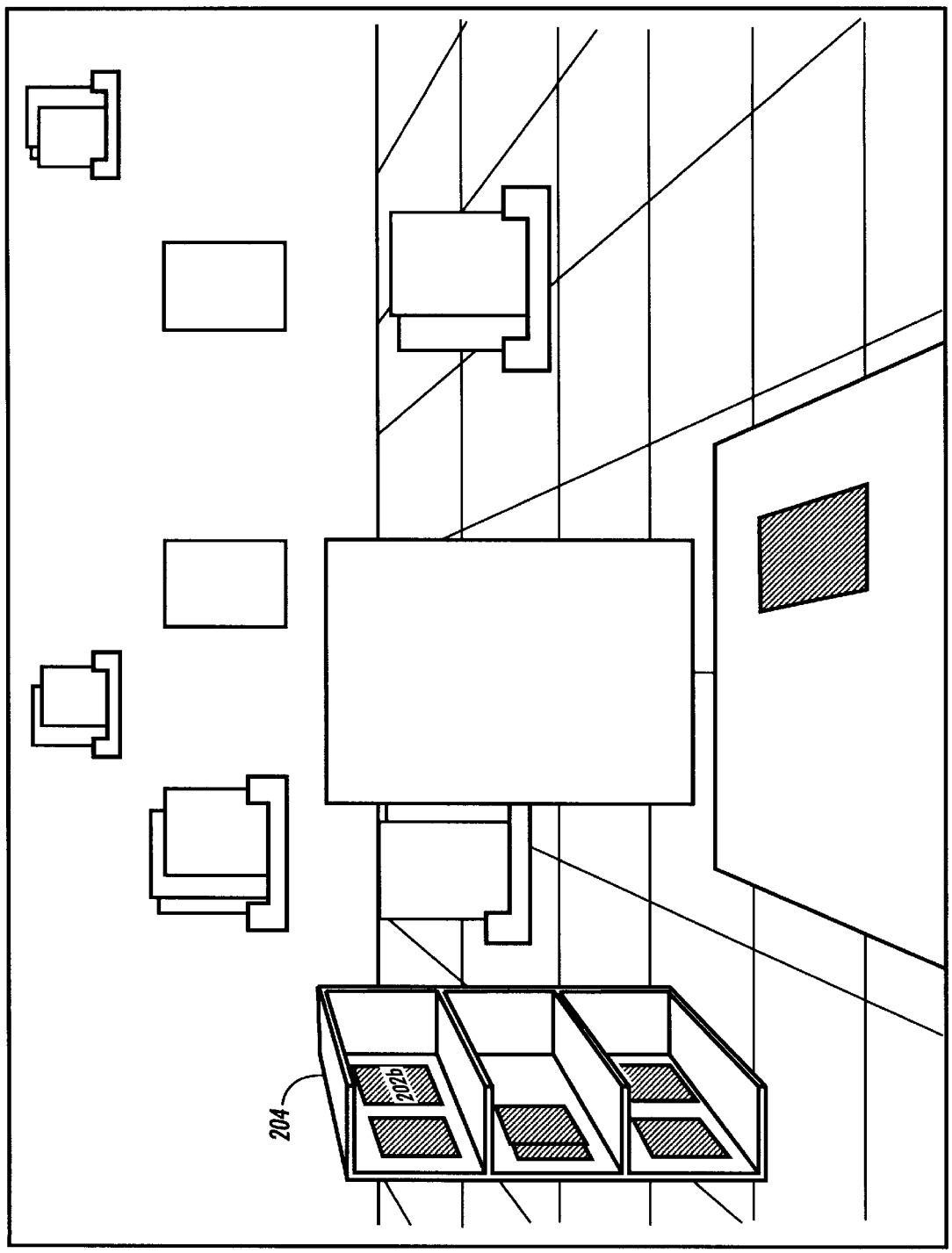

The touch drop gesture is illustrated in FIGS. 4–5. Referring to FIG. 4, page 202b on the desk is touched using a cursor control device. While the switch associated with the cursor control device remains depressed (i.e. is in the second down position), the cursor is moved and a line 401 is drawn. Note that in the currently preferred embodiment the line actually traces the movement of the cursor. However, it would be apparent to one in the currently preferred embodiment to indicate the line using a well known "rubber banding" technique between the original selection point and the position of the cursor. In any event, the line 401 terminates at the bookcase 220. Termination occurs by releasing the switch associated with the cursor control device (i.e. is in the first up position). Referring now to FIG. 5, the page 202b has been removed from desk 202 and has been placed on bookcase 220.

Figure 6:
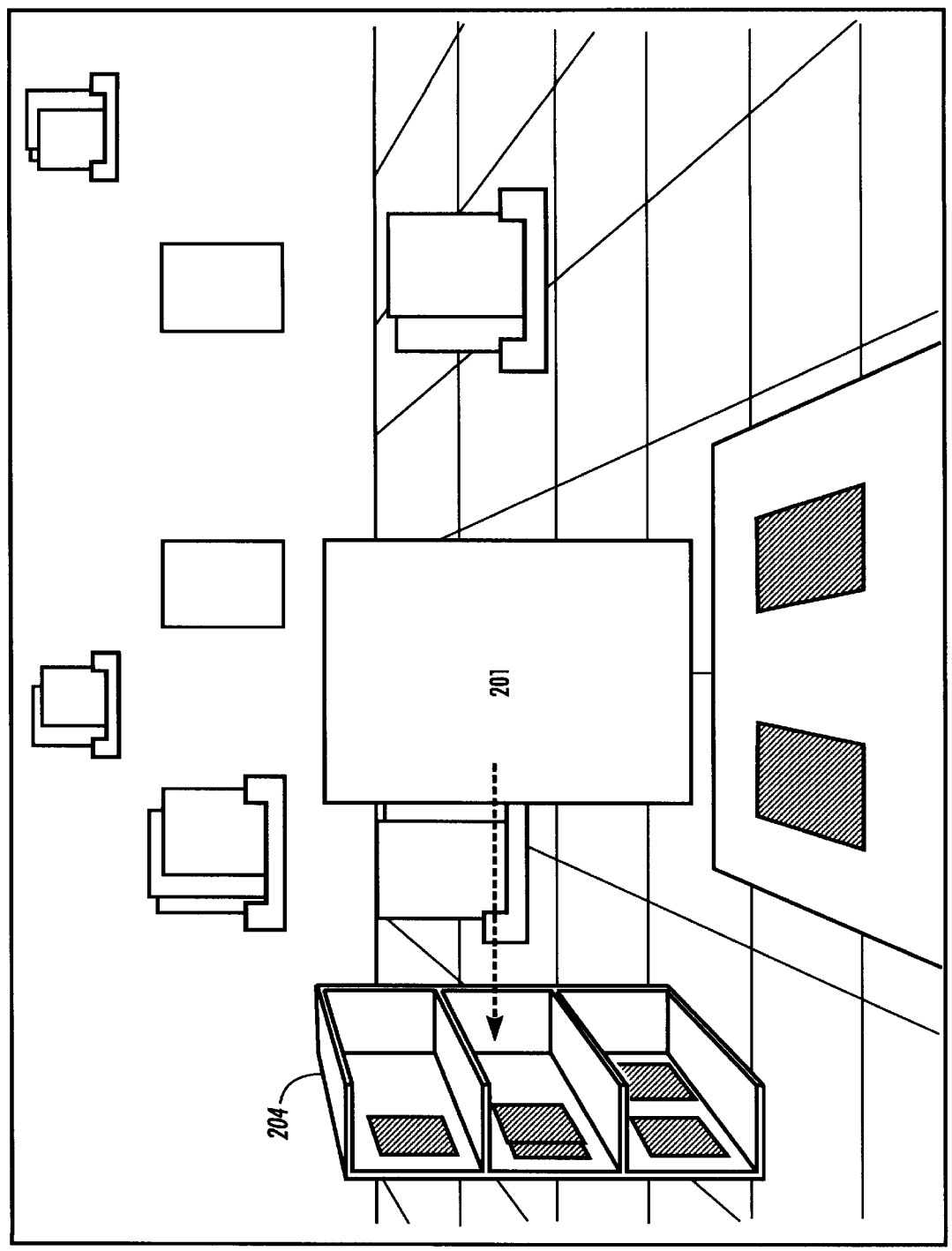
FIGS. 6–7 illustrate the context sensitive nature of the touch drop gesture as may be performed in the document workspace of the currently preferred embodiment of the present invention.
Figure 7:
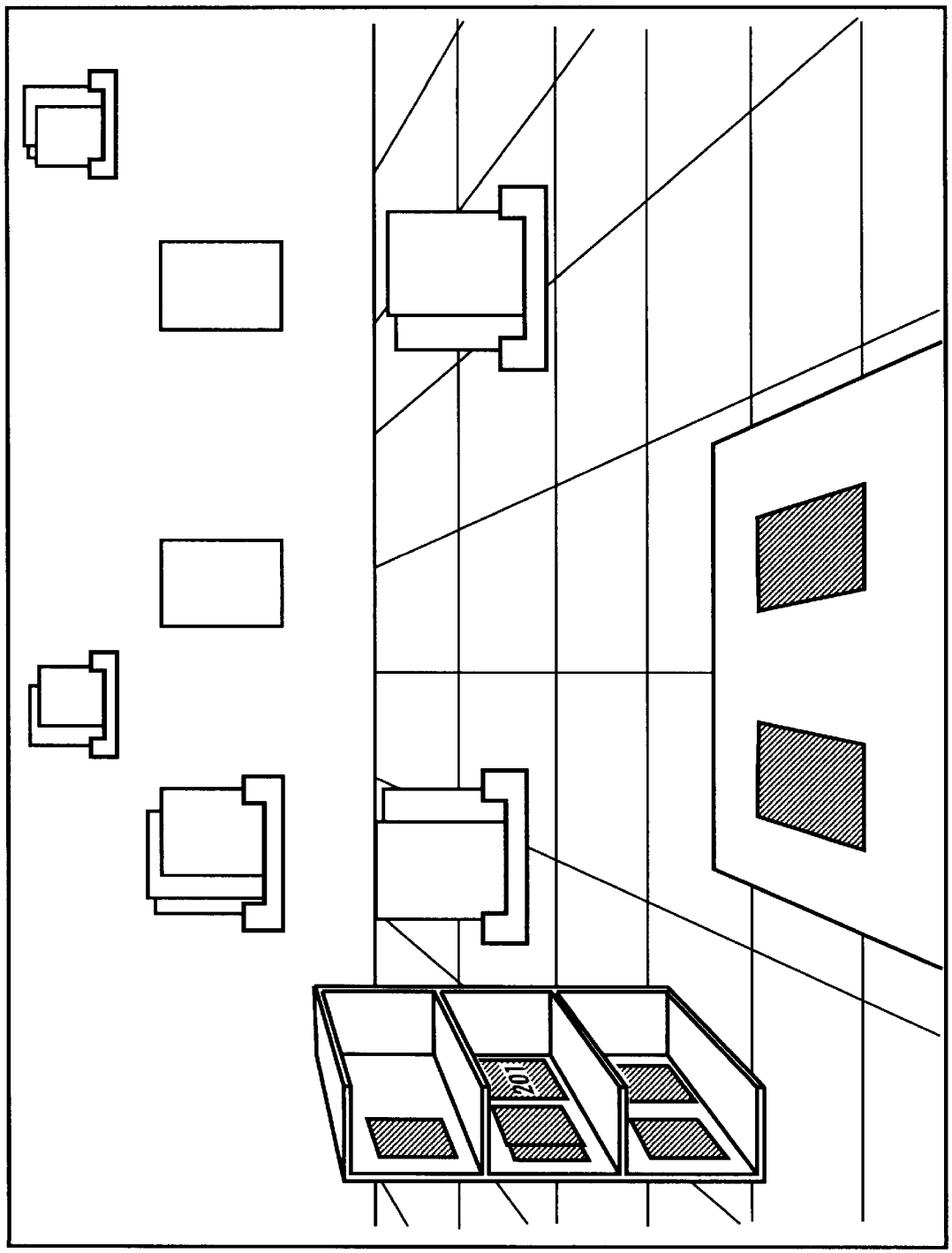

It should also be noted that the touch drop gesture is context sensitive. FIGS. 6–7 illustrate placement of a page on a bookcase. Referring to FIG. 6, page 201 is touched and to be dropped on bookcase 220. This is illustrated by the endpoint of line 601 touching the bookcase 220. The result is illustrated in FIG. 7 wherein the page 201 is removed from the focus space and is placed on bookcase 220. The actual movement of the document abject 201 to the bookcase 220 is "animated" so that the document object 201 appears to fly to the bookcase 220 when the cursor control button is released. This action is context sensitive since it recognizes any unique requirements of the drop location and performs any appropriate actions. In this case, the unique action concerns placing the page on the bookcase. So the appropriate action is to scale the page and place on an available location on the bookcase. Another example of context sensitive operation is discussed below with respect to placing one page on another for creating a pile.

The touch drop gesture also has the advantage of not requiring screen rendering of a workspace in order to move a document object.

Figure 8:
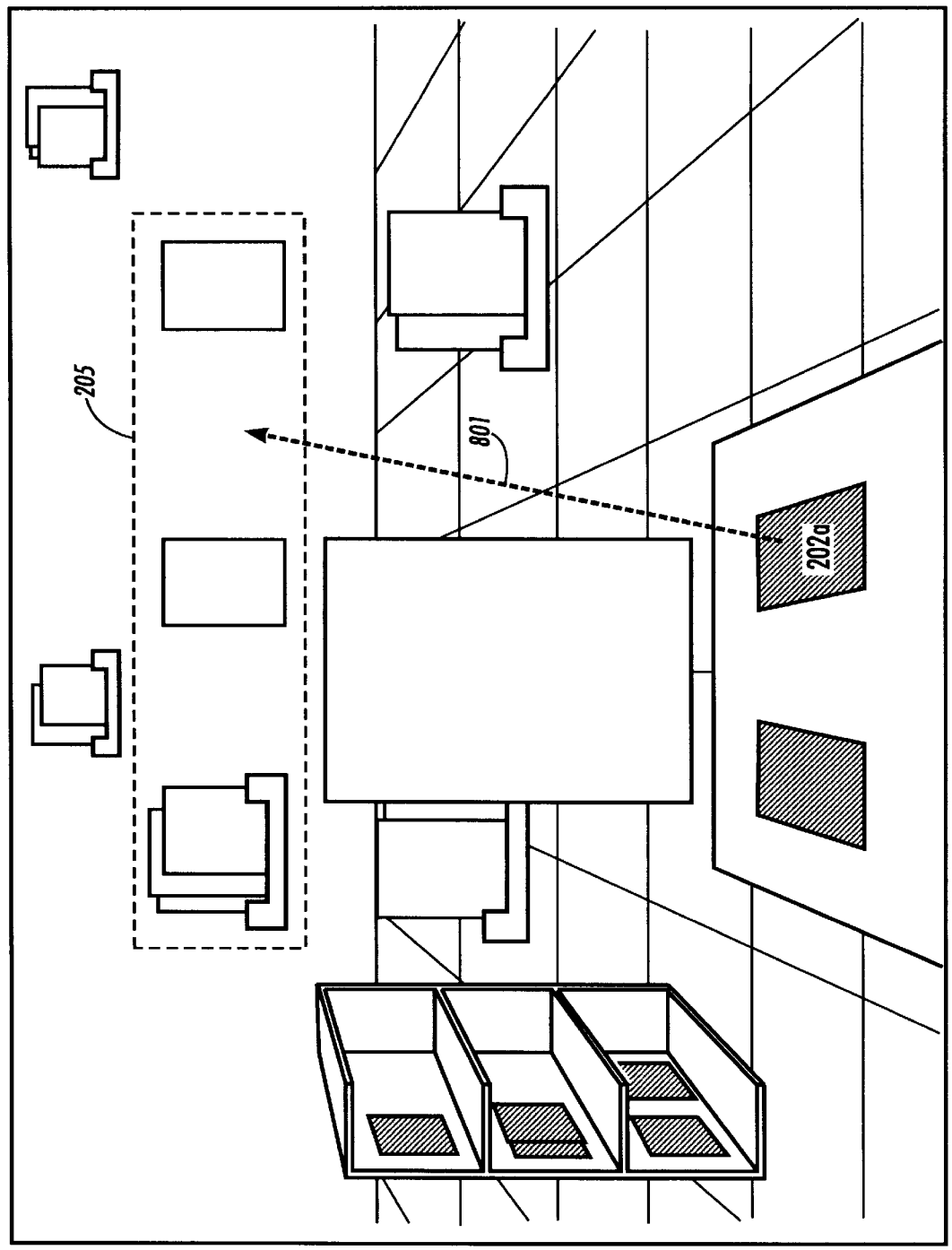
FIGS. 8–9 illustrate a flick gesture as may be performed in the document workspace of the currently preferred embodiment of the present invention.
Figure 9:
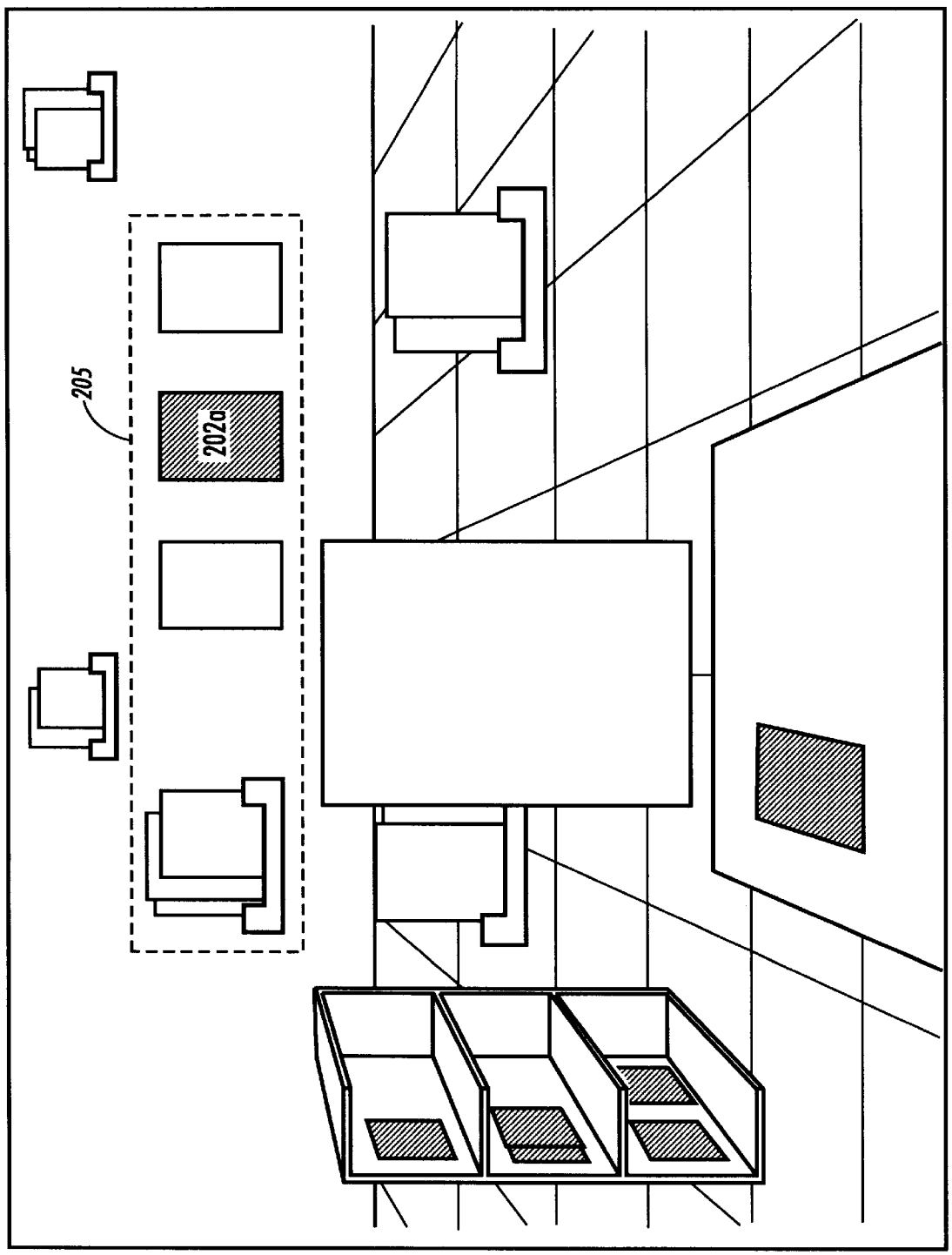

Another gesture used for moving objects is termed "flicking". In "flicking" a document object is moved by touching the object and "flicking" it using the cursor control device in a desired direction. Generally what occurs is that the object is touched and while the switch on the cursor control device remains depressed, the cursor is quickly moved in the desired direction and then released. The object will then move to the next immediate area (or to the tertiary area) in the direction of the "flicking" gesture. In the currently preferred embodiment, a downflick moves documents closer to the user (so the document object gets larger), upflicks move document away from the user (so the document object gets smaller), sideflicks move document objects to the bookcase or to other portions of the immediate areas. By adding some angle to the upflick gesture,'document objects can be positioned in a different X third of the next farther tier. Upflicking sends documents to the Y position in the next farther tier which is not occluded and the X gridding keeps more than one document object from ending up in the same or overlapping space. Flicking is illustrated in FIGS. 8–9. Referring to FIG. 8, page 202a on desk 202 is touched using a cursor control device. While a button associated with the cursor control device remains depressed a rapid movement of the cursor control device in an "upward" direction occurs and the button released (illustrated by line 801). The result is illustrated in FIG. 9 where the page 202a has been moved to tier 205 of the "air" portion of the immediate space in the document workspace.

It should be noted that "scaling" of document objects as they are moved from foreground to background positions in the document workspace is performed by the rendering system of the three-dimensional computer controlled display system. Thus, no further discussion of how document objects are scaled as they are moved through the document workspace is not deemed necessary.

Document Collections

In the currently preferred embodiment, collections of documents may be imported or they can be created dynamically. WebBooks are an example of collections of documents that are imported. A dynamic way of creating a collection is through "piling" documents on top of each other to create a pile. A pile is created simply by moving one document onto another document using a touch drop gesture. It should be noted that a pile may be added to another pile to create an even bigger pile. When a pile is created a "tray" is placed under them to indicate their relationship as a pile. The tray also provides a convenient "handle" for selecting the entire pile. The document objects are positioned in the pile by having each new page one quantum farther in radius from the center of the pile (in polar coordinates). The angle from the center is chosen randomly or it may be constant so that the document objects are in-line. When the angle from the center is chosen randomly, each pile will have a distinct appearance and each document in the pile will be visible.

Figure 10:
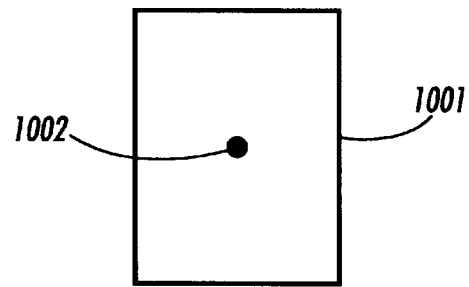
FIGS. 10–12 illustrate the creation of piles as may be performed in the document workspace of the currently preferred embodiment of the present invention.
Figure 11:
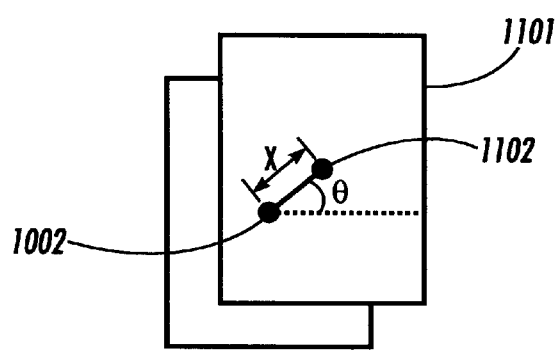
Figure 12:
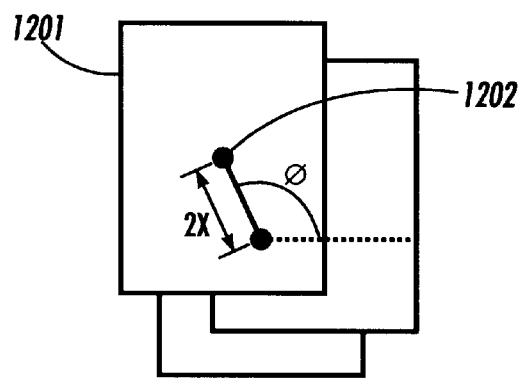

Creation of piles with the angle from the center chosen randomly is illustrated in FIGS. 10–12. Referring to FIG. 10, A document 1001 has a center 1002 which is located at the origin of a polar coordinate system (i.e. at coordinates 0,0). Referring now to FIG. 11, a document 1101 has been piled on top of document 1001. The center 1102 of document 1101 has been placed at coordinates ($\theta$, x). The angle $\theta$ is randomly chosen and the radius x is a constant. FIG. 12 illustrates a third document being placed on the pile. Referring to FIG. 12, a document 1201 having a center 1202 is added to the pile. In this case the center 1202 is at coordinate ($\phi$, 2x), again where the angle $\phi$ is randomly chosen and the radius 2x determined by when the document was added to the pile.

It should be noted that in the pile representation of the currently preferred embodiment, each document may be selected and brought to the top of the pile. When doing this, none of the other documents become blocked from view.

Piles may be generated automatically or manually. In manual creation, piles are simply created by causing documents (or other piles) to overlay each other. In automatic creation, a pile may be generated by a tool in the Document Workspace which looks for and retrieves documents according to some predetermined criteria.

ConeWalker

As noted above, the currently preferred embodiment provides tools for bringing new documents into the workspace. Generally, these are techniques for "prefetching" documents before they are actually needed. Because the documents are affirmatively linked by the creator of the original document, there is a reasonable anticipation that the user will want to view the linked documents. Having the documents prefetched enables a user to be more efficient since it will minimize delays in viewing the linked documents since transfer wait times occur concurrently with the users viewing activity. In any event, one technique for providing prefetching is the ConeWalker tool. The Cone-Walker tool enables a user to retrieve linked documents from a subject document. As the linked documents are retrieved, they are displayed using an information visualization technique commonly known as the cone tree. The cone tree is described in U.S. Pat. No. 5,295,243 entitled "Display of Hierarchical Three-Dimensional Structures With Rotating Substructures". The ConeWalker is a document object in the sense that it is a representation of a collection of documents.

Figure 13:
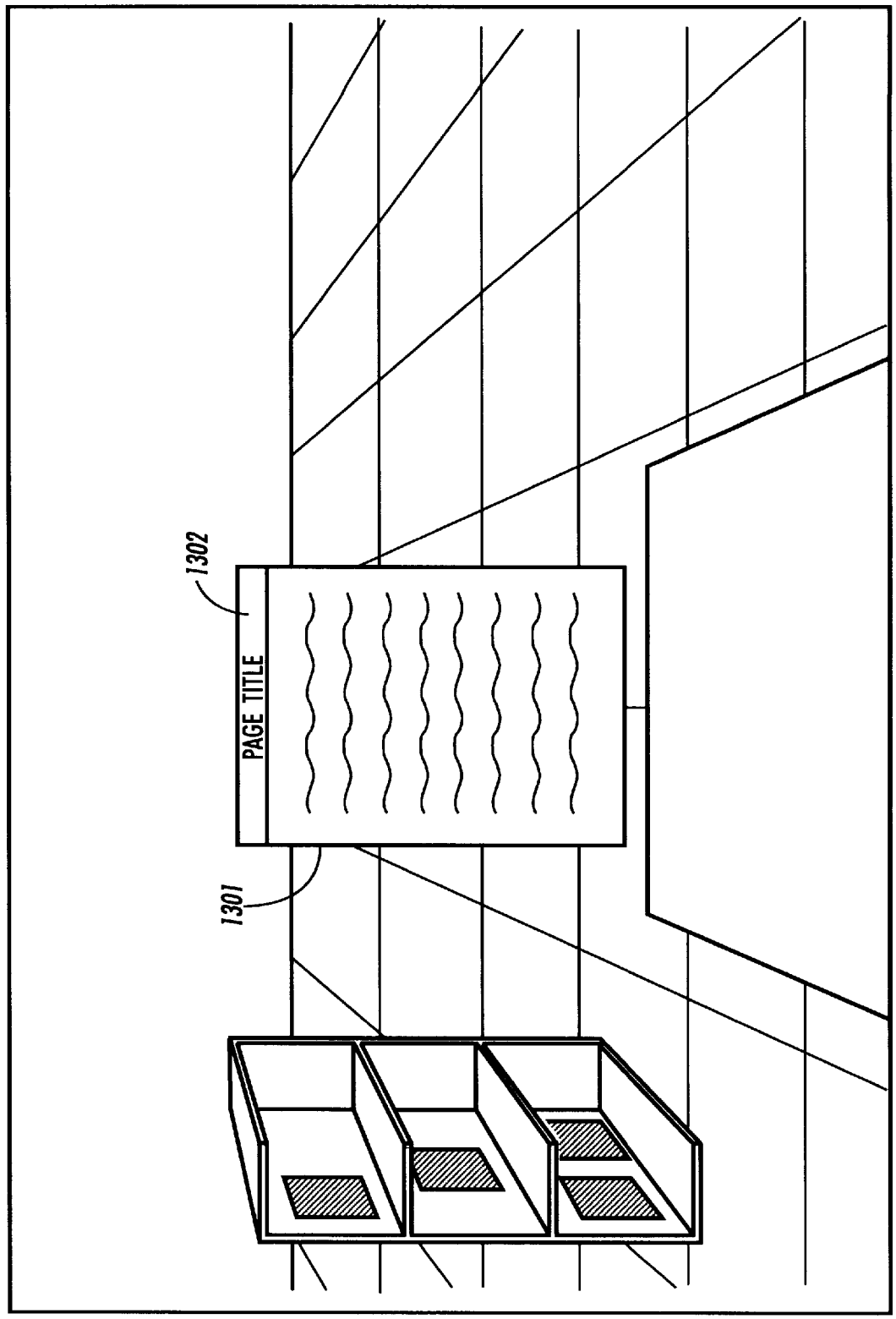
FIGS. 13–14 illustrate starting up a ConeWalker process from a document object as may be performed in the document workspace of the currently preferred embodiment of the present invention.
Figure 14:
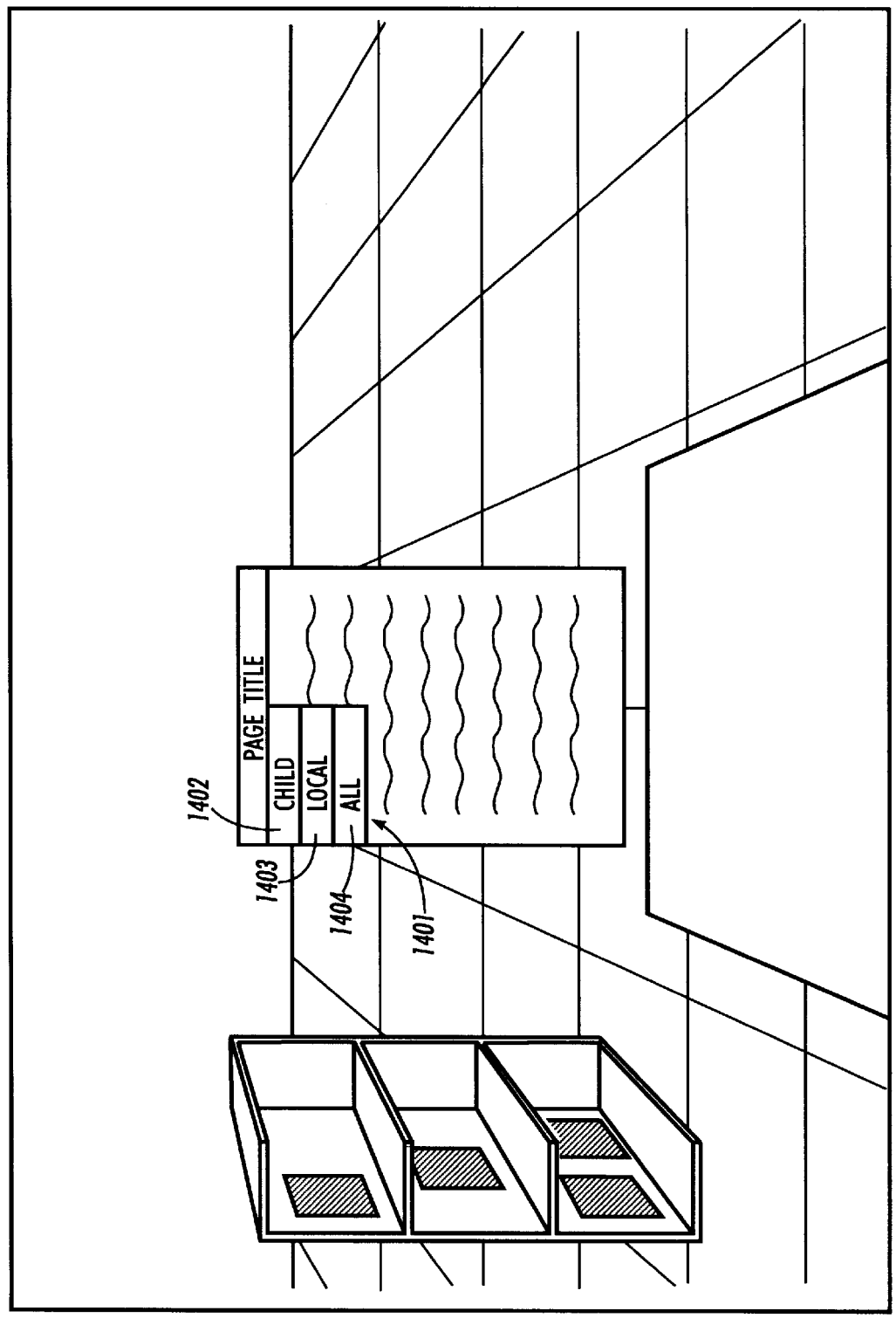

The ConeWalker is invoked by performing a click operation while the cursor is pointing to the title bar of a Web page (document) in the document workspace. While the description below is in reference to Web Pages, the same concepts may be applied to other collections of "linked" documents (e.g. a collection of documents in local storage such as a CD-ROM). This is illustrated in FIG. 13 by document 1301 having title bar 1302. The title bar 1302 is an area in the document "window" which identifies the document 1301. Referring now to FIG. 14, a menu 1401 is then displayed which offers three options 1402–1404 for starting and defining the scope of retrieval of pages during a ConeWalker process. So for example assume the page from which the ConeWalker is invoked has a URL of:

www.home.Acompany.com/first.html

Option 1402 labeled "CHILD"—retrieve pages having URLs that start with the same URL, e.g. www.home.Acompany.com/first.html/child1.html or www.home.Acompany.com/first.html/child2.html.

Option 1403 labeled "LOCAL"—retrieve only page that have a URL that starts with the same top-level site, namely pages having a URL www.home.Acompany.com.

Option 1404 labeled "ALL"—The button 1404 will retrieve all linked pages.

Figure 15:
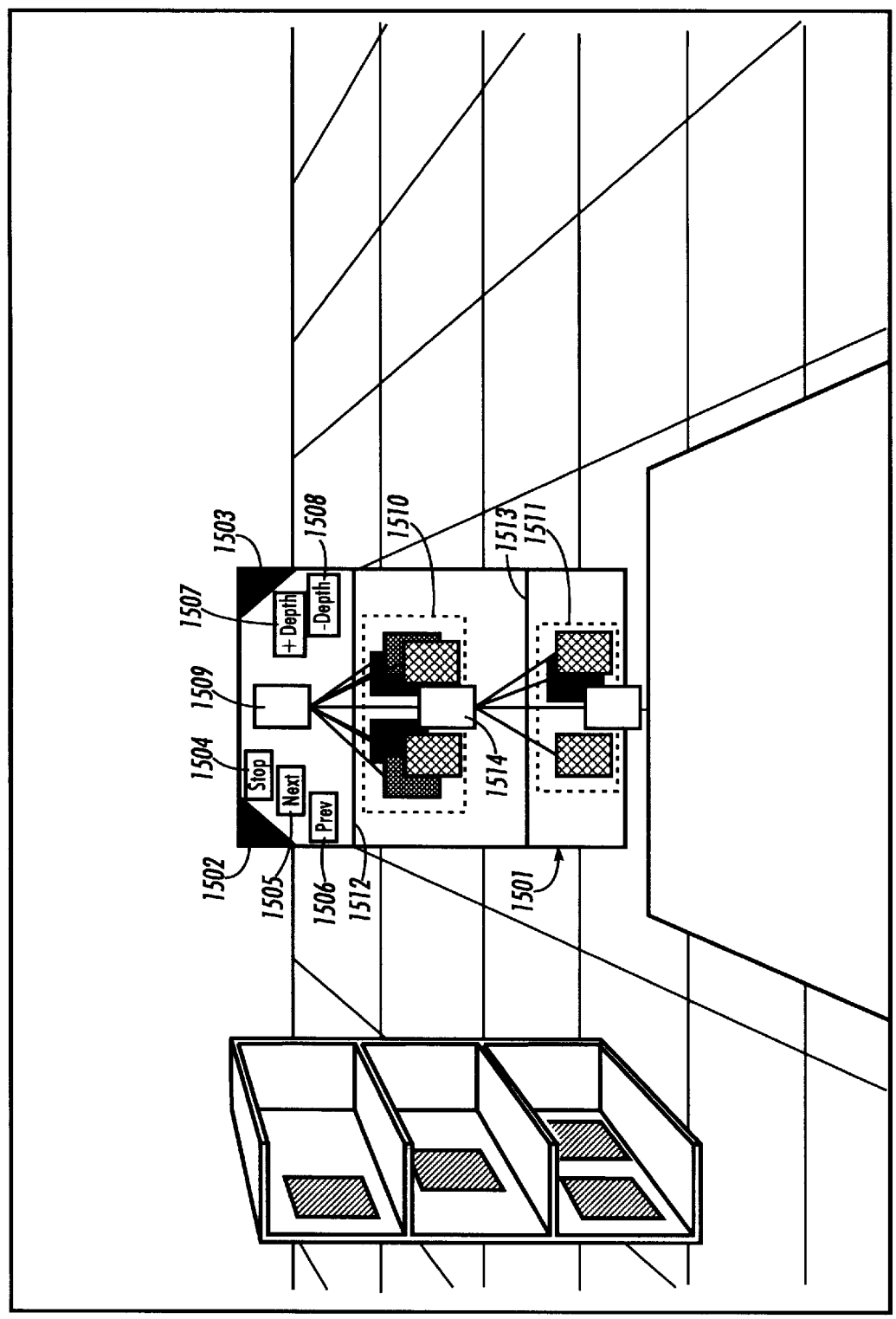
FIG. 15 is an illustration of the ConeWalker process in operation as may be performed in the document workspace of the currently preferred embodiment of the present invention.

FIG. 15 illustrates the ConeWalker operation in process. When a ConeWalker operation is invoked from a page, a framed cone tree 1501 (the ConeWalker object) is placed in the focus area of the document workspace and a process is started to walk the appropriate URL's and grow the cone tree. The two triangles 1502 and 1503 on the upper corners of the frame let the user access the touch and grasp manipulations of the document workspace.

Referring back to FIG. 15, the frame for the cone tree holds the following buttons for controlling the ConeWalker:

WALK/STOP Toggle BUTTON 1504—Start and stop the ConeWalker process. The walking is currently done in breadth-first order. Note that when the ConeWalker is processing the button displays the word "STOP" and when the ConeWalker is not processing the button displays the word "WALK".

NEXT and PREV BUTTONS 1505 and 1506—view the next or previous ConeWalker page in the document workspace focus area. Another ConeWalker page is initiated by a point and click operation on a child page on the cone tree. The ordering is depth-first so that the children pages are seen right after the corresponding parent page. The keystrokes "p" and "n" also have this functionality so that the user can rapidly scan the ConeWalker pages even when the Cone-Walker is in the history stack and the buttons are hard to click.

+DEPTH and –DEPTH BUTTONS 1507 and 1508— Increase or decrease the search depth limit for the Cone-Walker. Each unit of "depth" corresponds to a level of the corresponding cone tree. This button is used to continue a walk to the next level of linked pages (while retaining the originally defined scope parameters) or to walk backwards to remove a level. Without this limit a ConeWalker could run to excess when the users attention is diverted. Note that the cone tree is scaled in size, depending on the number of levels, to fit within the frame.

The cone tree is illustrated in frame 1501 by a representation of the starting page 1509 and the various levels of the walk. Here two levels, 1510 and 1511 are illustrated. Each level is marked by the lines 1512 and 1513. The level 1511 is the results of a walk along the links contained in linked page 1514.

A "right flick" gesture operation has been included so that the user can move ConeWalkers into a ConeWalker history stack positioned at the upper right of the document workspace. The right flick gesture is performed by placing the cursor on one of the triangles in the upper corners of the frame, depressing the switch associated with the cursor control device and moving the cursor to the right quickly while releasing the switch. This history stack is also a home for ConeWalker objects that must be moved out of the Web Forager focus area. The ConeWalker history stack helps users work with multiple simultaneous ConeWalkers. An illustration of the document workspace having a ConeWalker history stack is illustrated in FIG. 16. The history stack 1601 is positioned in the upper right hand corner of the document workspace.

Various cone tree "gardening" manipulations can also be used to limit where the ConeWalker searches. In the currently preferred embodiment, the user performs a "flick up" gesture on a cone tree node to indicate that this node and nodes in its subtree should not be expanded. An "X" is drawn through that node and the subtree corresponding to that node is made invisible. The ConeWalker process does not expand such nodes. Typically, this feature is used after the ConeWalker process has retrieved some pages. After stopping the process, the user views the pages and decides which ones should be "pruned". (Pruning can be done while the process is running but the user might be confused about which node to prune as the ConeWalker process adds new nodes to the tree).

The ConeWalker as described herein is for walks that start from a single URL. Other kinds of walks might also be useful to users. In particular, search results, such as those returned by search engines that perform searches on the Web, are an ordered list of URLs. The ConeWalker may incorporate a Document Lens visualization for walks that start from ordered lists.

Thus, a computer controlled display system for displaying a three dimensional document workspace having means for prefetching document objects is disclosed. While the present invention is described with respect to a preferred embodiment, it would be apparent to one skilled in the art to practice the present invention with other configurations. Such alternate embodiments would not cause departure from the spirit and scope of the present invention.

What is claimed is:

1. In a computer controlled display system for controlling the display of document objects in a three-dimensional document workspace, said three dimensional document workspace having a focus area for interacting with a document object, a method for retrieving document objects for display in said three-dimensional document workspace comprising the steps of:
   a) detecting that a user has indicated that they would like to prefetch document objects linked to a document object in said focus area;
   b) displaying said document object in a fetch window in said focus area, said fetch window having a plurality of means for a user to specify fetching options, said fetching options indicating a relationship between said document object in said focus area and said linked document objects;
   c) detecting that said user has initiated prefetching of document objects;
   d) determining what fetching options said user has specified;
   e) retrieving said linked document objects based on said user specified fetching options; and
   f) displaying said linked document objects in said fetch window so that they indicate their link relationship with said document object.

2. The method as recited in claim 1 wherein said step of displaying said linked document objects in said fetch window so that they indicate their relationship with said document object is comprised of the step of displaying said linked document objects as they are retrieved in a cone tree visualization.

3. The method as recited in claim 1 wherein one of said user specified fetching options indicates a depth of at least two for linked document objects to be retrieved.

4. The method as recited in claim 1 wherein one of said user specified fetching options indicates a scope of linked document objects to be retrieved, said scope indicating an addressing relationship between said document object and said linked document objects to be retrieved.

5. A program storage device readable by a machine, tangibly embodying a program of instructions executable by the machine to perform method steps for retrieving document objects for a three-dimensional document workspace, said three dimensional document workspace having a focus area for interacting with a document object, said method steps comprising:
   a) detecting that a user has indicated that they would like to prefetch document objects linked to a document object in said focus area;
   b) displaying said document object in a fetch window in said focus area, said fetch window having a plurality of means for a user to specify fetching options, said fetching options indicating a relationship between said document object in said focus area and said linked document objects;
   c) detecting that said user has initiated prefetching of document objects;
   d) determining what fetching options said user has specified
   e) retrieving said linked document objects based on said user specified fetching options; and
   f) displaying said linked document objects in said fetch window so that they indicate their link relationship with said document object.

6. The method as recited in claim 5 wherein said method step of displaying said linked document objects in said fetch window so that they indicate their relationship with said document object is comprised of the step of displaying said linked document objects as they are retrieved in a cone tree visualization.

7. The method steps as recited in claim 5 wherein one of said user specified fetching options indicates a depth of at least two for linked document objects to be retrieved.

8. The method steps as recited in claim 5 wherein one of said user specified fetching options indicates a scope of linked document objects to be retrieved, said scope indicating an addressing relationship between said document object and said linked document objects to be retrieved.

9. The method as recited in claim 1 further comprising the steps of:
   g) detecting that a user has requested that said fetch window be moved out of said focus area; and
   h) moving said fetch window to a predetermined area in said three-dimensional document workspace.

10. The method as recited in claim 1 further comprising the steps of:
   g) detecting that a user has requested that said retrieval be modified;
   h) visually indicating in said fetch window that said retrieval is modified; and
   i) continuing said retrieval based on said modification.

11. The method steps as recited in claim 5 further comprising the steps of:

g) detecting that a user has requested that said fetch window be moved out of said focus area; and h) moving said fetch window to a predetermined area in said three-dimensional document workspace.

12. The method as recited in claim 5 further comprising the steps of:

g) detecting that a user has requested that said retrieval be modified;

h) visually indicating in said fetch window that said retrieval is modified; and i) continuing said retrieval based on said modification.

13. A computer controlled display system for displaying document objects in a three-dimensional document workspace on a display, said three dimensional document workspace having a focus area for interacting with a document object, said computer controlled display system including a document object retrieval element, said document object retrieval element comprising:

a first detecting element for detecting a user has requested that documents associated with a document object displayed in said focus area be retrieved;

a fetch window display element responsive to said first detecting element, said fetch window display element for causing the display of said document object in a fetch window in said focus area, said fetch window having a plurality of means for a user to specify fetching options, said fetching options indicating a relationship between said document object in said focus area and said linked document objects;

a retrieval element for causing the retrieval of document objects responsive to fetching options specified by said user; and a document object display element for causing retrieved documents to be displayed in said fetch window so that they indicate their link relationship with said document object.

14. The computer controlled display system as recited in claim 13 wherein said document object display element is further comprised of a cone tree visualization element for causing said retrieved document objects to be displayed in a cone tree visualization indicating their linked relationship with said document object.

15. The computer controlled display system as recited in claim 13 wherein fetching options of said fetching window includes an option to indicate a depth of at least two for linked document objects to be retrieved.

16. The computer controlled display system as recited in claim 13 wherein fetching options of said fetching window includes an option to indicate a scope of linked document objects to be retrieved, said scope indicating an addressing relationship between said document object and said linked document objects to be retrieved.

17. The computer controlled display system as recited in claim 13 wherein said fetch window further comprises user invoked controls for starting and stopping said retrieval.

18. The computer controlled display system as recited in claim 13 wherein said fetch window further comprises user invoked controls for controlling said retrieval based so as to halt retrieval of an associated set of links.

19. A method for document retrieval from a collection of linked documents based on a currently viewed document having links to other documents in said collection, said method comprising the steps of:

a) detecting a user request to retrieve linked documents;

b) displaying retrieval scope options to said user;

c) displaying a retrieval object showing a representation of said currently viewed document;

d) retrieving linked documents based on said retrieval scope; and e) displaying a modified retrieval object showing said representation of said currently viewed document and said retrieved linked documents in a manner indicating the link relationship between said currently viewed document and said retrieved linked documents.

20. The method as recited in claim 19 wherein said retrieval object is a cone tree having said currently viewed document as a top node.

21. The method as recited in claim 19 further comprising the steps of:

a) said user indicating a change to said retrieval step;

b) continuing said retrieval based on said change; and c) modifying said retrieval object to indicate said change to said retrieval step.

* * * * *